June 29, 1954     J. F. KELLER     2,682,183
JIG BORING DEVICE
Filed July 23, 1952
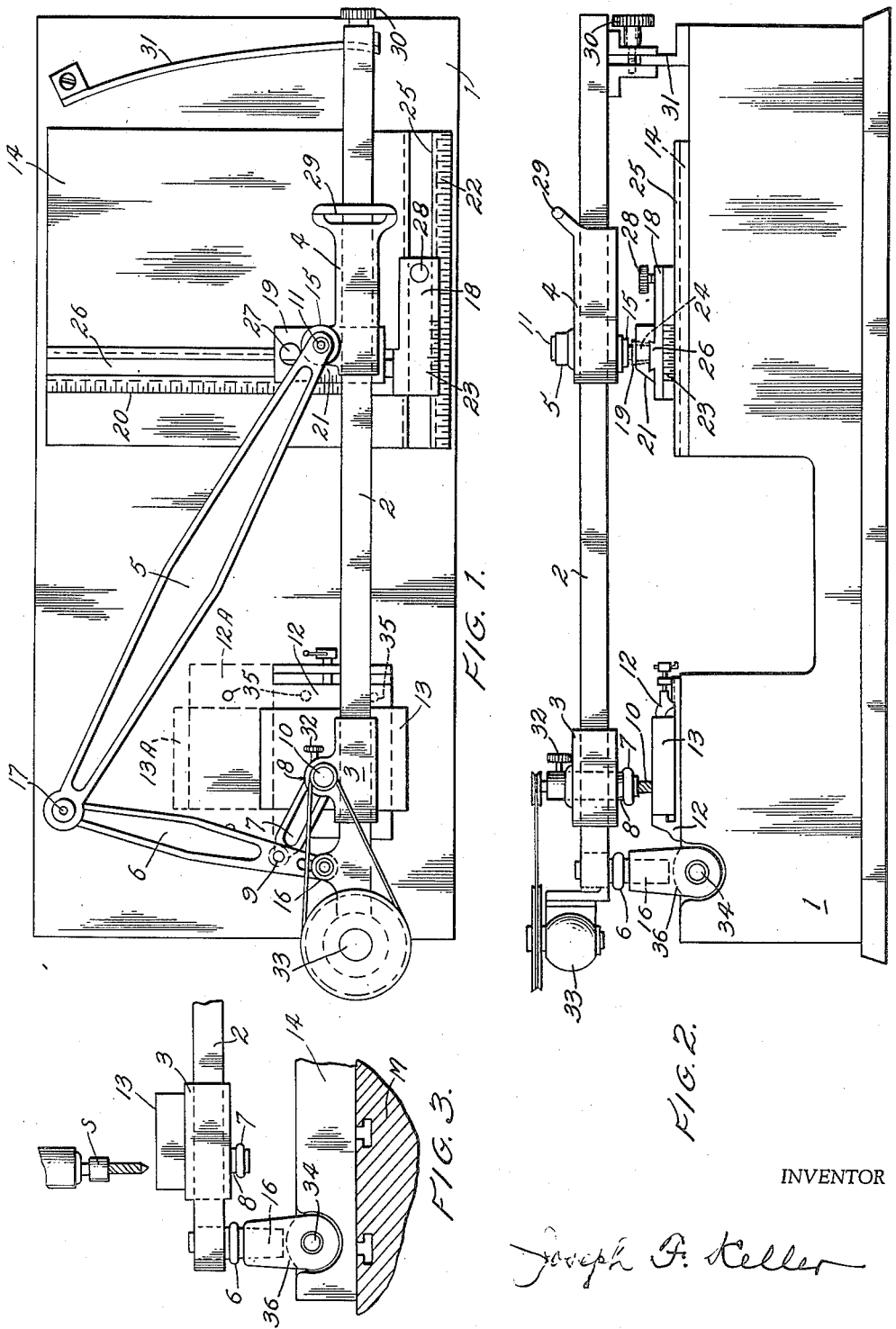
INVENTOR
Joseph F. Keller Patented June 29, 1954

2,682,183

UNITED STATES PATENT OFFICE 2,682,183

JIG BORING DEVICE

Joseph F. Keller, New York, N. Y.

Application July 23, 1952, Serial No. 300,459

3 Claims. (Cl. 77—5)

My invention relates to machines or devices with which it is desired to drill or bore holes the centers of which call for very accurate location and spacing.

This work is now being done on machines which are costly to build and comparatively slow in setting for the particular job.

It is an object of my invention, among others, to provide for a device that will permit drilling or boring holes accurately spaced from each other or from given reference points in a highly efficient manner and at low cost both of labor and equipment.

In my apparatus, given a machine with a good spindle rigidly supported as for example a vertical or horizontal milling machine, it is possible to get the required accuracy by using my device as an attachment. On the other hand, my apparatus may be constructed as a self-contained unit in which case a drive is provided for, and a boring tool with vertical feed is mounted, on one of the controlled parts of the device.

In the standard jig boring machines the spacing is dependent upon accurate and expensive measuring devices such as space blocks or very accurate lead screws which call for calibration and means for wear compensation. Great skill and experience is required to handle them.

In my device the spacing and location of the bored holes is taken care of by means of a simple control device which is equipped with two ordinary scales of commercially obtainable accuracy, positioned at fixed angles to each other, and with a corresponding vernier for each scale. The position of the tool with respect to the work, or vice versa, is obtained through said control device by means of pantograph reduction.

It is a very simple matter to set accurately the control device with the aid of the vernier scales. Any inaccuracy in their graduations and possibly in the manual setting is naturally minimized by the reduction the ratio of which can easily be made to be 1:10.

It will be noted that my means of location consumes less time than when space blocks are used.

Further advantages and objects of my invention will be found in the following description of some preferred embodiments thereof, reference being had to the accompanying drawing in which Fig. 1 is a plan view of a self-contained boring device of which Fig. 2 is the front view, some details being left out for the sake of clarity.

Fig. 3 illustrates an example, by showing the difference against the preceding one, of an embodiment where my device is an attachment to an existent machine.

In Figs. 1 and 2, the device proper is mounted on a base 1. A guide bar 2 is arranged to swing on a fulcrum bearing 16 in a horizontal plane. The bearing 16 itself is held in a bracket 36 which permits limited rotation around a horizontal bearing 34. This movement, however, is of no importance for the setting operation mentioned above, but is convenient for the manipulation of the control device, as will be shown later.

On the bar 2 are mounted two slides, 3 and 4, respectively. These slides move together on the bar 2, but their travel is controlled by a system of levers 5, 6 and 7 which constitute a pantograph linkage as shown in Fig. 1. In Fig. 2 the levers are not shown in full, but only their ends that are close to the bar 2.

Lever 5 is connected to slide 4 through bearing 11 and operates the secondary lever 6 through joint 17. Lever 6 is mounted on the other end at a point in line or concentric with fulcrum 16. It has attached to it through joint 9 the lever 7. Lever 7 through bearing 8 controls the movement of the other slide 3.

The slide 4 carries at its lower side a locating plug 15 which is preferably tapered and fits into a corresponding bushing 24 of the control device described further below. Plug 15 is in line or concentric with bearing 11.

The slide 3 carries, in this example, the boring spindle 10 concentric with bearing 8. The spindle is driven through a belt drive by a motor 33 mounted at the rear end of bar 2.

It will thus be evident that in order to bring the locating or guide plug 15 to any chosen position it must be moved in two directions: one direction through the rotary movement of bar 2 around its fulcrum bearing 16, the other direction through the lengthwise movement of slide 4 slidably mounted on bar 2.

Because the inner end of the lever 6 of the pantograph linkage is mounted in a bearing not shown concentric with that of fulcrum 16 of bar 2 any movement of guide plug 15 in the horizontal plane will be duplicated by the tool spindle at a reduced rate, the ratio of reduction being determined by the ratio of the relative distances of bearings 9 and 17, and of bearings 11 and 8, respectively, from fulcrum 16.

In other words, by positioning the guide plug 15 in a predetermined manner the tool spindle 10 will be positioned accordingly.

The work 13 is held in fixed position on the base 1 by suitable means such as clamping devices 12. Unless the work support is itself movable in vertical direction, a vertical feed for the boring tool 10 must be provided, as indicated at 32.

The control device required for setting the guide plug 15 at a desired location consists of a plate 14 on which two cross slides 18 and 19 are mounted so as to be movable at fixed angles to each other, in the present case at exactly right angles.

The lower slide 18 may be moved along dovetail guides 25 provided on plate 14, in direction right to left, or vice versa. It has a rectangular extension provided with dovetail guides 26 along which slide 19 may be moved crosswise. Either slide may be locked in any position by means of screws 27, or 28, respectively.

Slide 19 is equipped with a tapered bushing 24 adapted to receive with snug fit the tapered plug 15 of slide 4. Evidently, the guide plug 15 can be set, by means of the control device to any position within the area of plate 14, as far as the physical dimensions of slides 18, 19 and their guide ways 25, 26, respectively, will permit.

In order to set the guide plug 15 for a particular job so that the tool 10 will have the correct position with reference to the work 13, the slides 18, 19 must be correctly positioned first. This is easily accomplished by means of scales 20 and 22, respectively, and the corresponding verniers 21 and 23, respectively. Of course, if for instance the ratio of reduction is 1:10, then the scales must be at a scale 10 times as large as that used for measuring the spacing or location of the holes in work 13, or the proper data for setting the scales must be calculated according to the ratio.

To facilitate the setting it is advisable to lift the bar 2 with all its attached control elements, by means of the handle 29 and the above mentioned horizontal bearing 34. However, the scales and verniers can be made sufficiently accessible to dispense with bearing 34 and to leave plug 15 permanently engaged with bushing 24.

For additional safety it may be desirable to lock also bar 2 in position after the guide plug 15 has been properly lodged in bushing 24 of the already set and locked slides 18, 19. To this end a clamping device 30 may be provided at the end of bar 2 so as to engage a curved rail 31 in any angular position.

Now that the guide plug 15 is properly located within the control device, and consequently the tool spindle 10 is likewise correctly located with respect to the work 13, the drill or boring tool may now be started and gradually lowered or fed into the work by means of the vertical control 32. After finishing the hole the tool is raised. Now the clamping means 27, 28 and 30 may be loosened and the plug 15 moved into the next position by moving the bar 2 and the slides 18, 19 into a position determined by setting the verniers 21, 23 to a suitable figure of the corresponding scales 20, 22 which figures correspond, at the given rate of reduction, to the desired spacing or location of the next hole to be drilled or bored, in relation to the previous one.

It is evident that, since the movements of the locating plug 15 are converted into movements on the work 13 considerably smaller according to the ratio of reduction it would seem that work of larger size could not be handled easily on account of the limited capacity of the control device. However, in accordance with my invention, the work holding means 12 and the base 1 can be modified so as to increase the capacity of the apparatus very substantially. Both the clamping means 12 and the base 1—as also shown in Fig. 1—may be provided with corresponding and accurately spaced locating plugs and holes 35. The spacing of these locating means may be equal to a unit or a multiple of units of the scales 20, 22 or in a fixed proportion thereto, so that the work with its clamping means 12 may be transferred to a different position 13A on the base without abandoning a fixed relationship to the control device and its measuring devices.

While the above example refers to a self-contained boring machine, a slight modification of the apparatus as illustrated by Fig. 3 constitutes an attachment that may be connected to any existing and suitable machine with a bed and a boring or drilling spindle. In this case, the bed 1 of suitable height above the floor would be replaced by a strong base plate 1A of lesser thickness that can be clamped or screwed to the machine bed M. Since the machine in question is supposed to be of conventional design and has in itself nothing to do with the scope of my invention, I have shown of it only a fraction of the bed M and the tool-carrying end of its spindle S. Since tool S and bed M have a permanent relationship when set to work, and only the tool S has the required vertical movement or feed (unless the bed M is adapted to be raised in direction towards the tool) the end of bar 2 is not equipped with a motor and drive, and the slide 3 is constructed so as to receive the work 13 in clamped position.

In using the apparatus in substantially the same manner as described with reference to the first example, the same result will be obtained since the relative movements of tool and work, one with respect to the other, are the same in either case. Of course, in the first example, moving the plug 15 from one setting to another one further to the right or further up causes the tool to produce a hole further to the right and further up from the first one on the work. In the second example, this relation is reversed which has to be taken into consideration but does not cause any difficulties.

While I have described and illustrated some preferred embodiments of my invention I do not wish to be limited to any details thereof since the skilled in the art may introduce variations and modifications of details without, however, departing from the principle and basic idea of my invention.

What I claim is:

1. A boring device, comprising a guide bar rotatably mounted with substantially one end on a fulcrum, two slide pieces arranged for lengthwise movement on said bar, the said slide pieces being connected with each other through a pantograph lever linkage adapted to cause the movement of one slide to be controlled at a predetermined ratio by the movement of the other slide piece, the position of the said slide pieces on said guide bar with respect to said fulcrum being such that in an angular swing of the rotatable guide bar the relative ratio between the arc lengths described by the said slide pieces, respectively, is the same as that which governs said pantograph linkage, a supporting member for said fulcrum, a work holding device and a boring device, one of said devices being mounted on the said supporting means while the other device is mounted on that one of the said slide pieces which is nearer to said fulcrum, a locating means mounted in the more remote one of said slide pieces, a control device mounted on said supporting means in an area that can be substantially covered by the said more remote slide piece when moved along and with said guide bar, said control device consisting of cross slides adapted to be moved at fixed angles to each other and with respect to said supporting means, one of said cross slides being movable on the other one, each one of said cross slides and said control device being equipped with corresponding scales and verniers, respectively, adapted for measuring individually the relative movement of each cross slide in its specific direction of movement on said supporting means and control device, means to lock each cross slide in a chosen position, and means on at least one of said cross slides adapted to receive and to hold said locating means mounted on said more remote slide piece arranged on said guide bar.

2. Boring device as specified in claim 1, said supporting means being provided with means adapted to engage and to locate said work holder in a number of predetermined different positions with respect to said control device so that various areas of the work may be handled in succession by means of one control device which otherwise would not permit to cover the required area of said work.

3. Boring device, comprising a supporting means, a pantograph linkage operatively mounted on said supporting means, a boring spindle mounted on one of the controlled members of said pantograph linkage, a drive for said boring spindle, a guiding element arranged on a controlling member of said pantograph linkage, a control device mounted on said supporting means, in an area that is within the range of the possible movement of said guiding element, said control device consisting of cross slides adapted to be moved at fixed angles to each other and with respect to said supporting means, one of said cross slides being movable on the other one, each one of said cross slides and said control device being equipped with corresponding scales and verniers, respectively, adapted for measuring individually the relative movement of each cross slide in its specific direction of movement on said supporting means and control device, means to lock each cross slide in a chosen position, and means on at least one of said cross slides adapted to receive and to hold said guiding element, and a work holder on said supporting means adapted to hold the work in proper position with respect to said boring spindle.

References Cited in the file of this patent

UNITED STATES PATENTS

| Number | Name | Date |
|---|---|---|
| 1,313,543 | Keller | Aug. 19, 1919 |
| 1,692,103 | Williams | Nov. 20, 1928 |